United States Patent [19]

Luks

[11] 4,407,967
[45] Oct. 4, 1983

[54] METHOD FOR PRODUCING SPHEROIDAL CERAMICS

[75] Inventor: Daniel W. Luks, Frenchtown, N.J.

[73] Assignee: Frenchtown American Corp., Frenchtown, N.J.

[21] Appl. No.: 240,931

[22] Filed: Mar. 5, 1981

Related U.S. Application Data

[63] Continuation-in-part of Ser. No. 67,201, Aug. 16, 1979, abandoned.

[51] Int. Cl.$^3$ .............................................. C04B 21/06
[52] U.S. Cl. ...................................... 501/81; 264/13; 264/43; 264/44; 264/125
[58] Field of Search ..................... 264/13, 43, 44, 125; 501/81

[56] References Cited

U.S. PATENT DOCUMENTS

| | | | |
|---|---|---|---|
| 2,251,454 | 8/1941 | Jeffery | 264/5 |
| 2,872,719 | 2/1959 | Brassfield et al. | 264/13 |
| 4,151,235 | 4/1979 | May et al. | 264/13 |

Primary Examiner—James R. Hall
Attorney, Agent, or Firm—James J. Burke

[57] ABSTRACT

Spray dried spheroidal ceramic particles are fired at about 100° to 150° (C.) less than the optimum firing temperature, so as to achieve about 95% of theoretical density while avoiding more than nominal co-sintering (e.g. sticking together). The fired spheroidal ceramics are useful as such in a variety of applications, and can also be pressed into shapes and re-fired to form porous ceramic filter elements of closely controlled permeability.

8 Claims, 6 Drawing Figures

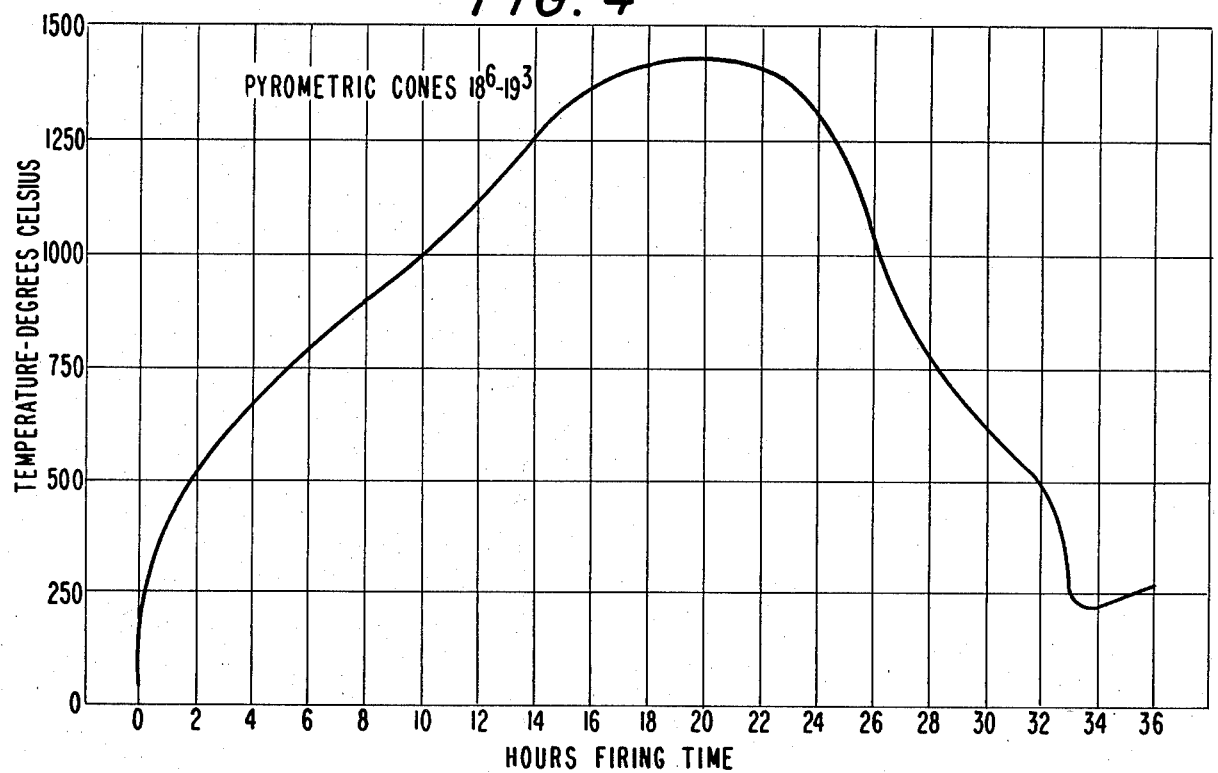
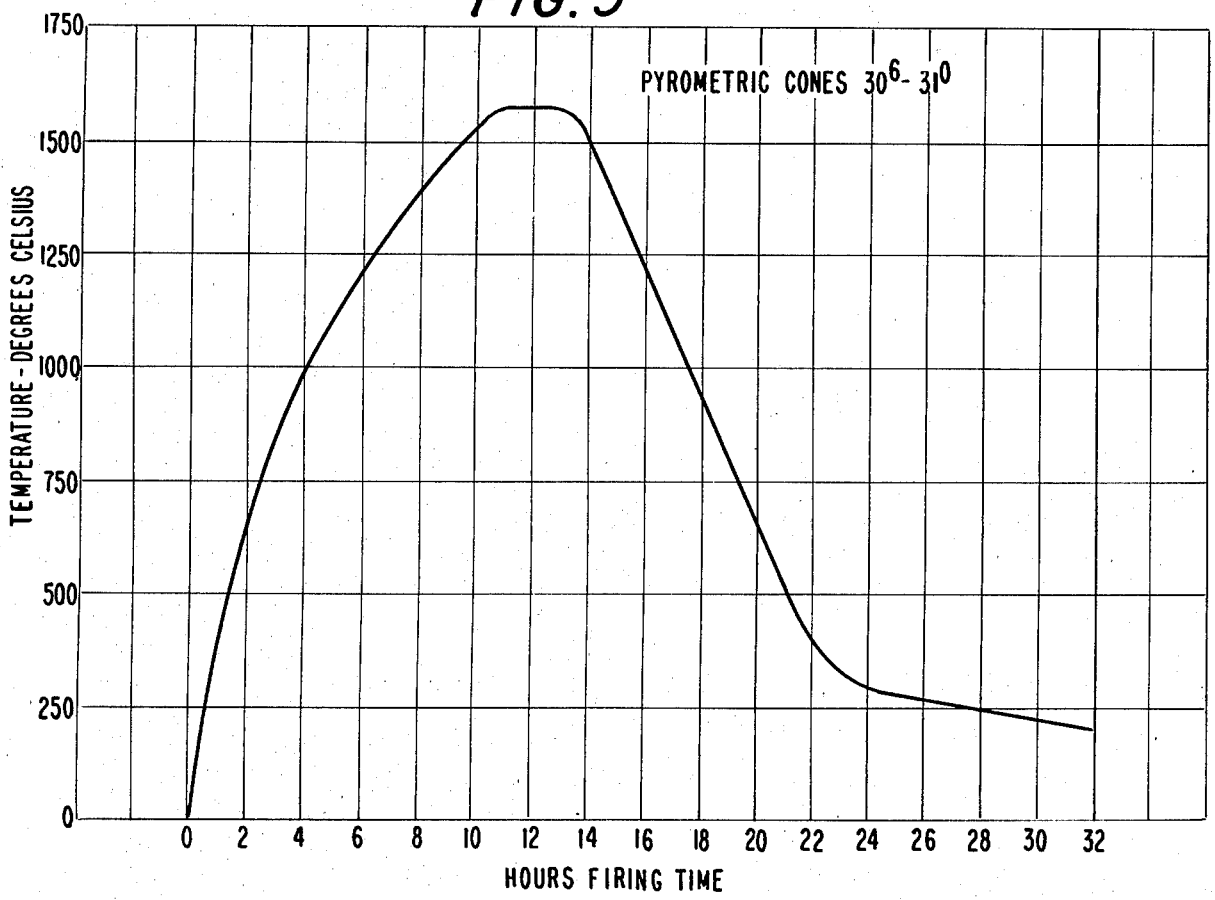

METHOD FOR PRODUCING SPHEROIDAL CERAMICS

RELATED APPLICATIONS

This application is a continuation in part of Application Ser. No. 067,201 filed Aug. 16, 1979 now abandoned.

BACKGROUND OF THE INVENTION

This invention relates in general to ceramics and, more particularly, it relates to preparing and firing spheroidal ceramic particles, to preparing useful products such as filter elements of closely controllable porosity therefrom, and to those products.

It has been known for many years to make spheroidal ceramic particles by the process known as spray-drying. Specifically, the ceramic particles are formed into water-based fluid slip, which generally contains additives such as dispersants or deflocculants, wetting agents, and binders. The slip is spun off rotating discs and falls as a fine spray through a column of hot gas. The resulting dry pellets are readily handled and flow into molds much more freely, having a much lower angle of repose (or critical surface angle) than powders not so treated. The application of spray-drying ceramics for use in forming spark plug cores is, for example, disclosed in U.S. Pat. No. 2,251,454 of Jeffery.

More pertinent to the present invention is the even earlier patent of Howe, U.S. Pat. No. 2,007,053, wherein porous granular ceramics are bonded to form filter elements, with uniform and controllable permeability. The patentee states that the raw ceramic powder (silicon carbide or alumina) may be mulled to grind down corners, but permeability is controlled in the first instance by grain size control, and, more importantly, selection of a bonding agent of controlled viscosity at the bonding temperature. The bonding agent is generally low-melting compared to the refractory material, e.g. ball clay, slip clay and/or feldspar. The essential concept is to control how the bonding agent flows over and coats the refractory particles during firing.

Other methods of making spheroidal ceramic pellets for particular applications are known but are less pertinent to the present invention. Thus, particles for use in molecular sieves are extruded into narrow strands and dried under conditions controlled to form individual uniform particles (U.S. Pat. Nos. 2,872,719 of Brassfield et al and 3,287,472 of Wolf et al). Lightweight, foamed ceramic particles are produced from slips by a variety of methods (U.S. Pat. Nos. 2,399,225 of Heany, 3,232,772 of Hilton et al, and 4,057,605 of Chauvin). Particles for use in catalysis or pebble heater applications fall in the same general category, but are so much larger than those used in the present invention that they are not deemed pertinent.

OBJECTS OF THE INVENTION

A general object of the present invention is to provide fine grained, cured, crystalline, ceramic spheroidal particles.

A further object of the present invention is to provide a curing method for loose ceramic particles that avoids significant co-sintering, whereby the original shape of said particles can be retained.

A still further object of the present invention is to provide sintered, porous ceramic products with closely controllable porosity.

Various other objects and advantages of the invention will become clear from the following description of embodiments thereof, and specific examples, and the novel features will be particularly pointed out in connection with the appended claims.

THE DRAWINGS

Reference will hereinafter be made to the accompanying drawings, wherein:

FIG. 4 is a firing curve at pyrometric cones $18^6-19^3$;

FIG. 5 is a firing curve at pryometric cones $30^6-31°$; and

DESCRIPTION OF EMBODIMENTS

Figure 1:
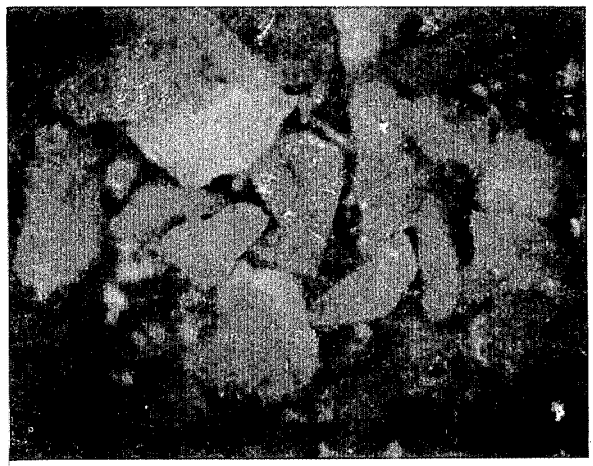
FIG. 1 is a photomicrograph, 100x, showing commercial aluminum oxide granules, the particles shown being a $-120+170$ mesh fraction.

In a first aspect, the present invention is based on the discovery that spheroidal ceramic particles of particular utility in ceramic filters and similar applications can be prepared by conventional spray drying followed by a novel pre-firing in a kiln. More particularly, the ceramic granules are pre-fired under conditions controlled to (1) achieve at least about 95% of optimum density, but (2) avoid such sintering or sticking together of particles during the firing that their spheroidal nature is necessarily destroyed during subsequent processing needed to restore the particles to their original, desired size or size range. What is deemed surprising about this aspect of the invention is that conventional wisdom would indicate that conditions (1) and (2) are substantially antithetical, e.g. conditions severe enough to bring about the density of (1) would necessarily involve the sintering of (2).

Since the firing of even finely-divided ceramics is a slow process, firing under circumstances that avoid particle-to-particle contact is totally impractical.

It has been determined that for compositions and conditions described below, pre-firing at about 90% of the optimum firing or curing temperature resulted in good density, but co-sintering was slight, e.g. particles were separable with finger-nail pressure. Generally, 90% of the optimum curing temperature corresponds to a temperature about 100° to 150° C. lower than the curing temperature (which is known for any particular ceramic). On a larger scale, it was found that the particles separated with a few minutes of light mulling, and retained their spheroidal shape. By contrast, the same particles pre-fired at the optimum temperature required heavy impacts—hammer blows—to achieve any separation. Thus, one can start with spheroidal particles, fire or cure below the conventional temperature, and after mild agitation as in light mulling, break up any aggregates of stuck-together (co-sintered) particles and end up with spheroidal particles again.

At the outset, certain caveats should be noted. As those skilled in the art are aware no two kilns behave exactly alike, available spray drying equipment will not turn out a totally uniform product, and other variables such as ambient temperature and humidity are essentially uncontrollable outside of the laboratory. Thus, in any given situation some experimentation will be necessary to carry out the invention successfully. Certain of the procedure therefore are described below.

As used herein, the word "spheroidal" describes the spray-dried granules, pre-fired granules and granules in the finished product; it should be understood that this is a generally descriptive term and does not imply geometric perfection, or even a close approximation of same (as might, for instance, be implied from "spherical"). The words "granules" and "particles" are used interchangeably since, where needed, actual sizes or size ranges are noted. The word "green" means unfired. Lastly, firing cycles will be spoken of in terms of relative "severity", but it should be understood that there are no magic formulas or scales that can quantify this, except in the quite empirical manner represented by the Seger Pryometric Cone system.

In a second aspect, the invention relates to the preparation of useful products, such as pre-fired ceramic filters of closely controllable porosity, from the spheroidal, pre-fired ceramic particles described herein. Insofar as is known, these ceramic spheroids are rounder and harder than particles available heretofore. As a result, when packed together and sintered into a desired monolith, a more uniform product is produced. Because glassy phases are non-existent or minimal, porosity is not so much a function of surface flows during sintering as it is of particle sizes, whether the latter be a specific range or an intentional mixture of sizes.

It is of course apparent that in any collection of perfectly packed, perfectly uniform spheres the pore volume is a function of the mode of packing and not the size of the spheres; marbles and basketballs will enclose the same percentage of pore space. But the mode of packing (cubic, hexagonal close-pack, etc.) is never perfect in the real world of filter-sized materials, nor are spheres uniform or, indeed, very "spherical". Nevertheless, specific size fractions of the pre-fired pellets of the invention are remarkably uniform, so that a remarkable degree of control can be obtained.

Attention is initially directed to FIG. 1, which is a photo-micrograph of a commercial alumina, that shown being a −120+170 mesh fraction. The generally acicular nature of the material is apparent. In accordance with the invention, a slip is prepared with the following composition:

| Alumina | 88.5 parts by weight |
| dolomite | 2.25 |
| talc | 0.6 |
| clay | 8.9 |
| granular wax | 4. |
| water glass | 0.25 |
| water | 38.1 |

The water glass is a dispersant which allows less water to be used, saving energy during spray drying. The talc, dolomite and clay are fluxes forming complex glassy phases. This is milled for 12 hours in a ball mill loaded half full with high-alumina ceramic pebbles. Spray drying to form spheroidal particles follows.

The pellets are loaded into containers called saggers and fired in a tunnel filn. Since the noted composition is well known, its optimum firing temperature and resultant properties were known from experience. The optimum for alumina ceramics is generally characterized by 10–15$\mu$ crystals. Over-firing causes greater crystal growth, which weakens the body and lessens dielectric strength. Specifically, when fired to cone 30 down, this ceramic has a fired bulk density of 3.65, and pressed compacts exhibit a fired flexural strength of 54k psi and no water absorption. The firing curve is shown in FIG. 5. Experimentation showed that when the same pellets were fired to cone 19 down (see FIG. 4), bulk density was 3.53 and the particles were easily separable. Other properties were similarly less than optimum: compacts exhibited a flexural strength of 43k psi, and open porosity, as measured by water absorption, was 0.1%.

Separation of the particles was carried out by mulling for 30 minutes in an edge runner mill. The product was screened and the following particle-size analysis resulted.

| U.S. Standard Screen Mesh Size | Particle Diameter-Inches | Percent Of Fraction |
|---|---|---|
| −60 + 80 | 0.0098–0.0070 | 1.9% |
| −80 + 120 | 0.0070–0.0049 | 16.9 |
| −120 + 170 | 0.0049–0.0035 | 19.8 |
| −170 + 200 | 0.0035–0.0029 | 20.2 |
| −200 + 325 | 0.0029–0.0017 | 20.5 |
| −325 | less than 0.0017 | 20.7 |
| Total | | 100 |

Figure 2:
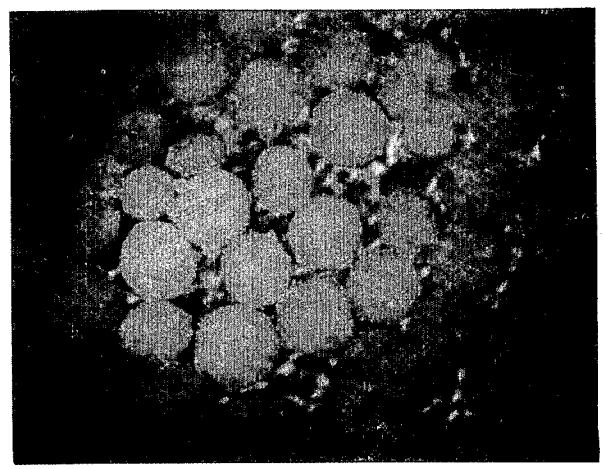
FIG. 2 is a photomicrograph, also 100x, showing prefired spheroidal particles in accordance with the invention, the ceramic composition including 94% Al$_2$O$_3$, and also being a $-120+170$ mesh fraction.

The −120+170 mesh fraction was photographed at 100x, and the results are shown in FIG. 2. The contrast with "raw" alumina of the same size and at the same magnification, FIG. 1, is apparent. Obviously, the mulling is effective to separate the individual particles but does not destroy or even degrade their spheroidal shape.

Once the granules have been pre-fired and separated they may, for various applications, be used as is. Thus, spheroidal pellets of a black alumina composition (including minor proportions of manganese, chrome and iron oxides) have been found to be excellent solar energy absorbers. The particles are both harder and more spheroidal than garnet, and thus may be employed as a superior albeit artificial garnet cloth. The particles can also be bonded with glass or epoxy to form a pipe lining for abrasive slurries.

The application of the invention which is deemed the most important, however, is porous ceramic bodies useful as filter elements. A novel aspect of this application is the use of specific mixtures of pre-fired and unfired pellets to achieve a predictable and controllable porosity in the final product.

In essence, the pre-fired particles or the mixture of fired and unfired (green), both of specified size range, is mulled with dry powdered wax or a wax emulsion, and desired shapes are pressed in steel or carbide dies. Firing is carried out at the full curing temperature of the composition.

The composition of spheroidal particles used for producing porous bodies was as follows:

| Alumina | 93.4% |

-continued

| | |
|---|---|
| Silica | 2.9 |
| Soda and Potassic | 0.2 |
| Iron Oxide | 0.2 |
| Manganese Oxide | 3.3 |
| | 100.00% |

A screen analysis of the same material after pre-firing at cone 14⁶-15³ (1400° C.) and mulling was:

| | |
|---|---|
| 80 Mesh | 0.02% |
| −80 + 120 Mesh | 4.77 |
| −120 + 170 Mesh | 34.70 |
| −170 + 200 Mesh | 25.81 |
| −200 + 325 Mesh | 29.84 |
| −325 Mesh | 4.86 |
| | 100.00% |

The particles were divided by screening into the fractions shown in the following tabulations. The compositions were weighed as shown and were individually dry mulled to thoroughly mix the wax with the spheroidal particles. Samples were pressed at 20K psi in a carbide die into 1.14" diameter discs which were then fired at cone 18⁶-19° (about 1500° C.) in a 32 hour cycle. The properties of the fired discs are listed below the respective compositions.

TABLE I

| | Effect of Spheroidal Particles Size | | | |
|---|---|---|---|---|
| Composition | A | B | C | D |
| Graded −120 + 170 Mesh | 100 | | | |
| Graded −170 + 200 Mesh | | 100 | | |
| Graded −200 + 325 Mesh | | | 100 | |
| Graded −325 Mesh | | | | 100 |
| Fine Powdered Wax | 8 | 8 | 8 | 8 |
| Total | 108 | 108 | 108 | 108 |
| Green Bulk Density | 2.20 | 2.16 | 2.13 | 2.12 |
| Fired Bulk Density | 2.50 | 2.47 | 2.47 | 2.60 |
| Firing Shrinkage | 6.81% | 7.12% | 7.58% | 9.70% |
| Water Absorption | 11.53% | 12.24% | 12.14% | 10.24% |
| Open Pore Volume | 28.84% | 30.26% | 30.02% | 26.58% |
| Permeability of Air at 52 mm Hg | 20.1 | 18.2 | 13.6 | 5.5 |

TABLE I-continued

| | Effect of Spheroidal Particles Size | | | |
|---|---|---|---|---|
| Composition | A | B | C | D |

Figure 3:
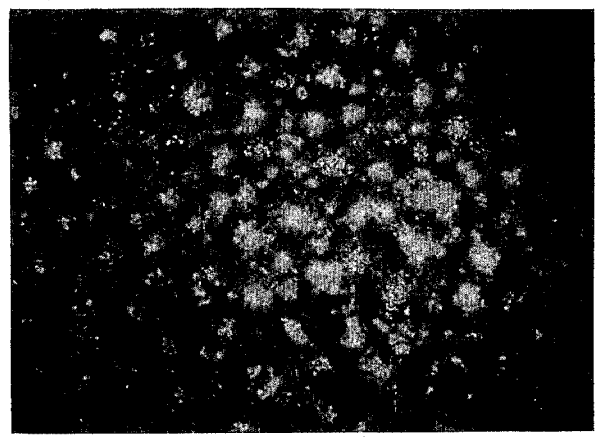
FIG. 3 is a photomicrograph, also 100x, showing a refired body of spheroidal particles of the same size as shown in FIG. 2, which were sintered together in accordance with the firing cycle illustrated in FIG. 4.

It can be seen that the finer the spheroidal particles, the lower the permeability of air at a given pressure. FIG. 3 is a photomicrograph of the B composition.

In order to further control the degree of porosity and permeability, the "green" unfired bodies from which the above described spheroidal particles were made, were blended in various proportions with the fired spheroidal particulate material. A representative oxide analysis of the unfired and fired body is as follows:

| | Unfired | Fired |
|---|---|---|
| Alumina | 92.8% | 93.4% |
| Silica | 2.9 | 2.9 |
| Soda and Potassia | 0.2 | 0.2 |
| Iron Oxide | 0.2 | 0.2 |
| Manganese Oxide | 3.3 | 3.3 |
| Combustibles | 0.6 | — |
| | 100.0% | 100.0% |

In this case the materials were used without division into various size fractions, hence the screen analysis of this additive remained the same as shown above.

The batches were weighed as shown below and were individually mulled to make sure of thorough distribution of the unfired body powder with a pre-fired spheroidal particles. 1.14" diameter discs were pressed from each body at 20K psi and were fired at cone 18⁶-19° (1500° C.) in a 32 hour cycle. The properties of the fired discs are given below the respective compositions.

TABLE II

| | Effect of Unfired Powder Additive | | | | | |
|---|---|---|---|---|---|---|
| Composition | E | F | G | H | I | J |
| Sphero-particulate Pellets Prefired Cone 14⁶-15³ (1400° C.) (Un-fractioned) | 100 | 95 | 90 | 80 | 60 | 20 |
| Unfired Body Powder | 0 | 5 | 10 | 20 | 40 | 80 |
| Fine Wax Powder | 8 | 8 | 8 | 8 | 8 | 8 |
| Total | 108 | 108 | 108 | 108 | 108 | 108 |
| Green Bulk Density | 2.31 | 2.41 | 2.48 | 2.55 | 2.54 | 2.39 |
| Fired Bulk Density | 2.51 | 2.69 | 2.78 | 2.94 | 3.10 | 3.29 |
| Firing Shrinkage | 5.54% | 6.25% | 6.67% | 8.14% | 10.31% | 14.35% |
| Water Absorption | 11.50% | 8.61% | 7.40% | 4.28% | 2.11% | 0.26% |
| Open Pore Volume | 28.91% | 23.19% | 20.61% | 12.59% | 6.55% | 0.86% |
| Permeability of Air at 52 mm. of Hg Pressure (mls/min./cm² /mm Hg) | 12.48 | 6.82 | 4.11 | 1.02 | 0.12 | 0 |

TABLE II graphically illustrates the fact that additions of unfired powdered body to prefired spheroidal particles of the same body, reduces the porosity, absorption, permeability of the composite in proportion to the amount of additive. By this method a composite of desired degree of permeability can be produced.

Further tests were carried out with 0–100% of −325 mesh powder and 100–0% of two particular size fractions, spheroidal particles, −120+170 mesh and −80 mesh.

Results are tabulated below.

TABLE III

PROPERTIES OF SPHERO-CRYSTALLINE COMPOSITES COMPRISING SPHEROIDAL PARTICLES GRADED −120 + 170 MESH

| Composition | K | L | M | N | O |
|---|---|---|---|---|---|
| −120 + 170 Mesh Spheroidal Particles of 94% $Al_2O_3$ Body Prefired Cone $14^6$-$15^3$ | 100 | 90 | 80 | 60 | 0 |
| −325 Mesh powder of same body unfired | 0 | 10 | 20 | 40 | 100 |
| Powdered Microcrystalline Wax | 8 | 8 | 8 | 8 | 8 |
| Total | 108 | 108 | 108 | 108 | 108 |
| Properties of Composites Pressed 1400 kg/cm$^2$ and Fired Cone $18^6$-$19^3$ | | | | | |
| Fired Bulk Density | 2.40 | 2.72 | 2.92 | 3.14 | 3.27 |
| % Total Pore Volume | 37.86 | 29.81 | 24.60 | 18.84 | 15.49 |
| % Closed Pore Volume | 5.08 | 6.22 | 8.07 | 10.17 | 15.31 |
| % Open Pore Volume | 32.77 | 23.59 | 16.63 | 8.68 | 0.19 |
| Permeability of air at 0.4 kg. pressure (mls./min./cm$^2$/mm Hg.) | 16.44 | 7.11 | 1.68 | 0.11 | 0.00 |

TABLE IV

PROPERTIES OF SPHERO-CRYSTALLINE COMPOSITES COMPRISING SPHEROIDAL PARTICLES GRADED −80 MESH

| Composition | P | Q | R | S | T | U | V |
|---|---|---|---|---|---|---|---|
| −80 mesh spheroidal particles of 94% $Al_2O_3$ body prefired Cone $14^6$-$15^3$ | 100 | 95 | 90 | 80 | 60 | 20 | 0 |
| −325 Mesh powder of same body unfired | 0 | 5 | 10 | 20 | 40 | 80 | 100 |
| Powdered Microcrystalline Wax | 8 | 8 | 8 | 8 | 8 | 8 | 8 |
| Total | 108 | 108 | 108 | 108 | 108 | 108 | 108 |
| Properties of Composites Pressed 1400 kg/cm$^2$ and Fired Cone $18^6$-$19^3$ | | | | | | | |
| Fired Bulk Density | 2.51 | 2.69 | 2.78 | 2.94 | 3.10 | 3.29 | 3.30 |
| % Total Pore Volume | 35.05 | 30.41 | 28.07 | 23.98 | 20.01 | 15.05 | 14.85 |
| % Closed Pore Volume | 6.14 | 7.22 | 7.46 | 11.39 | 13.46 | 14.19 | 14.25 |
| % Open Pore Volume | 28.91 | 23.19 | 20.61 | 12.59 | 6.55 | 0.86 | 0.60 |
| Permeability of air at 0.45 kg. pressure (mls./min./cm$^2$/mm Hg.) | 12.48 | 6.82 | 4.11 | 1.03 | 0.13 | 0.00 | 0.00 |

Figure 6:
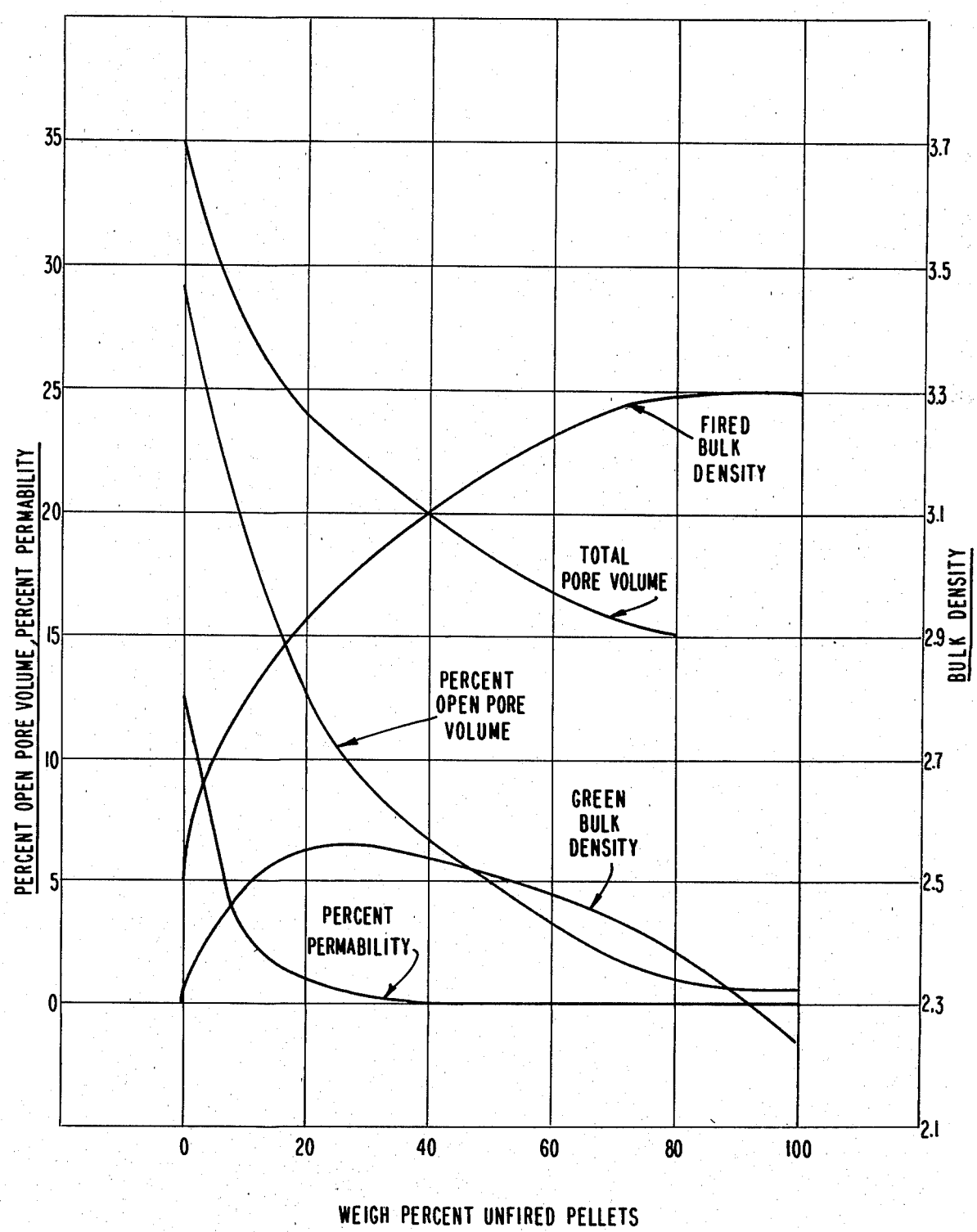
FIG. 6 is a plot of densities, pore volumes and permeabilities of bodies made from mixtures of prefired and unfired pellets.

To better understand the close control that can be achieved with the inventions, measurements on samples P through V have been plotted as a function of unfired pellet content, and results are set forth in FIG. 6. This is believed to be substantially improved control over permeability that has been heretofor possible in ceramic filter elements.

In tests W and X, it is seen that doubling the amount of wax did not noticeably change pore volume or flow rate.

Use of a softer wax in an emulsion, tests Y and Z, resulted in denser compacts and lowered pore volumes and flow rates.

In the next three tests, AA, BB and CC, bentonite, unfired alumina powder and feldspar were interchanged. The bentonite and unfired powder had essentially the same effect, but feldspar produced a more penetratable compact. However, tripling the amount of feldspar, to 15% (test DD) reduced permeability somewhat. The feldspar has the following analyses:

| | |
|---|---|
| Silica | 66.0% |
| Alumina | 18.7 |
| Sodium Oxide | 2.8 |
| Potassium Oxide | 12.0 |
| Other | .5 |
| | 100.0% |

This will produce more glossy phases than the other fillers.

A further series of tests was carried out to determine the effect of the wax binder, and to the effect of using bentonite or feldspar instead of unfired alumina powder. The same 93.4% $Al_2O_3$ material as noted supra was used, and the pre-fired pellets were graded, a −80+200 mesh fraction being used. This fraction had the following distribution:

| | |
|---|---|
| −80 + 120 mesh | 7.31% |
| −120 + 170 mesh | 53.15 |
| −170 + 200 mesh | 39.54 |
| | 100.00% |

Results are set forth in Table V.

Thus, Table V shows that amount and type of waxes can be varied, and that several types of "filler" powder can be used with the spheroidal pellets while maintaining acceptable permeability in the fired compact.

Various changes in the details, steps, materials and arrangements of parts, which have been herein described and illustrated in order to explain the nature of the invention, may be made by those skilled in the art within the principle and scope of the invention as defined in the appended claims.

TABLE V

| COMPOSITION | EFFECT OF VARIATIONS IN FLUXES AND BINDERS | | | | | | | |
|---|---|---|---|---|---|---|---|---|
| | W | X | Y | Z | AA | BB | CC | DD |
| Sphero-particulate Pellets pre-fired Cone $14^6$–$15^0$, Screened −80 + 200 mesh | 100 | 100 | 100 | 100 | 95 | 95 | 95 | 95 |
| Bentonite | — | — | — | — | 5 | — | — | — |
| Unfired powder | — | — | — | — | — | 5 | — | — |
| Kingman Feldspar | — | — | — | — | — | — | 5 | 15 |
| #1245M Wax emulsion (45% wax content) | — | — | 8 | 16 | — | — | — | — |
| Fortex Micronized Wax | 4 | 8 | — | — | 8 | 8 | 8 | 8 |
| TOTALS | 104 | 108 | 108 | 116 | 108 | 108 | 108 | 108 |
| Green Bulk Density (Pressed 400 kg/cm$^2$) | 2.17 | 2.23 | 2.33 | 2.47 | 2.32 | 2.33 | 2.28 | 2.31 |
| Firing Shrinkage (Linear) | 6.18% | 6.28% | 5.60% | 6.24% | 6.54% | 6.81% | 4.72% | 6.04% |
| Fired Bulk Density (Fired Cone $18^6$–$19^0$) | 2.53 | 2.51 | 2.29 | 2.58 | 2.56 | 2.65 | 2.45 | 2.56 |
| Porosity (Water Absorption) | 11.01% | 11.20% | 9.42% | 9.92% | 9.55% | 9.34% | 11.30% | 8.37% |
| Open Pore Volume | 27.95% | 28.15% | 21.66% | 25.65% | 24.53% | 24.76% | 27.99% | 21.09% |
| Permeability of air at 52 mm. of Hg (mls./min./cm$^2$/mm Hg) | 13.73 | 13.19 | 11.38 | 11.76 | 11.75 | 10.31 | 15.37 | 13.48 |

What is claimed is:

1. The method of producing spheroidal ceramic particles comprising:

preparing a ceramic slip including particles of a particular composition and known curing temperature;

forming green, spheroidal ceramic particles by spray drying said slip;

firing said green particles at about 100° to 150° C. below the optimum curing temperature to produce spheroidal particles of less than maximum bulk density and to avoid any substantial sintering together of said particles; and agitating the fired particles to separate particles that have sintered together during firing into individual spheroidal particles.

2. The method as claimed in claim 1, wherein said agitation and separation of particles is carried out by mulling.

3. Spheroidal ceramic particles produced by the method of claim 1.

4. The method of producing porous ceramic bodies comprising:

preparing a ceramic slip including particles of a particular composition and known curing temperature;

forming green, spheroidal ceramic particles by spray drying said slip;

firing said green particles at about 100° to 150° C., below the optimum curcing temperature to produce particles of less than maximum bulk density and to avoid any substantial sintering together of said particles; and agitating the fired particles to separate particles that have sintered together during firing into individual spheroidal particles;

classifying the separated, fired particles into size fractions;

mixing a fraction of the fired particles with a binder material;

forming the particle-binder mixture into a body of desired shape; and firing the shaped body at the optimum curing temperature to produce a porous ceramic body.

5. The method as claimed in claim 4, wherein said binder is a wax emulsion.

6. The method as claimed in claim 4, wherein said binder is wax.

7. The method as claimed in claim 4, and additionally comprising:

adding a controlled amount of green particles of a smaller size fraction and the same composition as said fired particles to said fired-particle-binder mixture, whereby porosity of said ceramic body is controllably reduced.

8. Porous ceramic bodies produced by the method of claim 4.

* * * * *